United States Patent [19]

Zingde et al.

[11] Patent Number: 5,565,538

[45] Date of Patent: Oct. 15, 1996

[54] DIBROMOSTYRENE-GLYCIDYL(METH)-ACRYLATE COPOLYMERS

[75] Inventors: Gurudas Zingde, West Lafayette; Nicolai A. Favstritsky, Lafayette; Ray W. Atwell, W. Lafayette, all of Ind.

[73] Assignee: Great Lakes Chemical Corporation, West Lafayette, Ind.

[21] Appl. No.: 309,901

[22] Filed: Sep. 21, 1994

[51] Int. Cl.$^6$ .......................... C08F 24/00; C08F 12/16; C08L 37/00; C09K 21/08

[52] U.S. Cl. .......................... 526/273; 525/208; 526/293; 252/609

[58] Field of Search .................... 526/293, 273; 525/208; 252/609

[56] References Cited

U.S. PATENT DOCUMENTS

| | | | |
|---|---|---|---|
| 4,604,438 | 8/1986 | Beuhler et al. | 526/262 |
| 4,625,004 | 11/1986 | Younes | 526/262 |
| 4,663,386 | 5/1987 | Younes | 524/548 |
| 4,668,750 | 5/1987 | Younes | 526/262 |
| 4,684,692 | 8/1987 | Younes | 524/548 |
| 4,711,941 | 12/1987 | Younes | 526/272 |
| 4,728,463 | 3/1988 | Sutker et al. | 252/609 |
| 4,777,227 | 10/1988 | Wrezel et al. | 525/207 |
| 5,112,914 | 5/1992 | Mizuno et al. | 525/134 |
| 5,194,482 | 3/1993 | Chundury et al. | 524/412 |
| 5,268,438 | 12/1993 | Carson et al. | 526/273 |
| 5,300,568 | 4/1994 | Abe et al. | 525/68 |

FOREIGN PATENT DOCUMENTS 1088737 11/1980 Canada .................... 31/154

OTHER PUBLICATIONS

Beuhler et al., Electron Packaging Mat. Sci. II, pp. 223–234 (1986).

Nae et al., "New Epoxy Resins Based On Bromostyrene–Butadiene Cotelomers", Dep. Mater. Res., Weizmann Inst. Sci. (Israel), Polym. Prepr., (Am. Chem. Soc., Div. Polym. Chem.), vol. 27, No. 2, pp. 399–400 (1986).

Natta, Giulio, "Precisely Constructed Polymers", Scientific American, vol. 205, No. 2, pp. 33–41 (1961).

*Primary Examiner*—Sharon Gibson
*Assistant Examiner*—Joseph D. Anthony
*Attorney, Agent, or Firm*—Woodard, Emhardt, Naughton Moriarty & McNett

[57] ABSTRACT

Flame retardant additive for plastics, compositions containing the additive, and methods for preparing the additives and compositions. The additives include a halostyrene-glycidyl (meth)acrylate copolymer. The compositions include a thermoplastic substrate requiring flame retardancy and copolymers of a halostyrene and glycidyl (meth)acrylate.

27 Claims, No Drawings

DIBROMOSTYRENE-GLYCIDYL(METH)-ACRYLATE COPOLYMERS

FIELD OF THE INVENTION

The present invention generally relates to flame retardant polymer compositions. In particular, the invention relates to flame retardant compositions including random copolymers of halostyrene and glycidyl (meth)acrylate units.

BACKGROUND OF THE INVENTION

One of the most dangerous elements of a fire is the combustible nature of polymers. Polymeric materials are involved in most of the deaths, injuries and property losses that result from fires. In spite of the combustibility of polymers, they have become essential due to their utility in virtually every area. Therefore, significant efforts have been directed towards improving the fire resistance of polymers. Among these efforts are the addition of flame retardants. Most of the additives are alumina trihydrates, organochlorine compounds, organobromine compounds, organophosphorous compounds, antimony oxides, and boron compounds.

Polymeric flame retardant additives are preferred in the industry over the low molecular weight (e.g. less than 20,000 daltons) ones due to their resistance to blooming; i.e. separation from the substrate. Unfortunately, polymeric additives often prove detrimental to the physical properties of plastics in which they are blended. This is mainly due to the incompatibility of the polymeric additive and the resin.

A need exists for effective flame retardant additives which do not negatively impact the physical properties of plastics.

SUMMARY OF THE INVENTION

A flame retardant additive for plastics is provided which includes a random copolymer of glycidyl (meth)acrylate and a halostyrene. The invention also includes compositions of a substrate and halostyrene-glycidyl meth(acrylate) copolymer additives. Also included are methods for producing such flame retardant additives and thermoplastic compositions.

It is an object of the invention to provide flame retardant additives for polymeric materials, and compositions containing such additives, including copolymers of glycidyl (meth)acrylate and substituted halostyrenes which do not have a deleterious effect on the physical characteristics of the material.

It is another object of the invention to provide methods for making flame retardant additives and flame retarded thermoplastic compositions.

These and other objects, advantages and features are accomplished according to the compositions and methods of the following description of the preferred embodiment of the present invention.

DESCRIPTION OF THE PREFERRED EMBODIMENT

For the purpose of promoting an understanding of the principles of the invention, reference will now be made to certain embodiments and specific language will be used to describe the same. It will nevertheless be understood that no limitation of the scope of the invention is thereby intended, such alterations, further modifications and such applications of the principles of the invention as illustrated herein being contemplated as would normally occur to one skilled in the art to which the invention relates.

Flame retardants interfere with combustion chemistry to reduce the flammability of a combustible material. Unfortunately, flame retardants can also alter essential physical characteristics of the material. For example, some flame retardants cause brittleness which results in a loss of impact strength. This has been a major obstacle to the addition of flame retardants to plastics. The present invention avoids this problem with the use of a thermoplastic flame retardant additive containing halostyrene and glycidyl (meth)acrylate monomers. Glycidyl (meth)acrylate is used herein to refer to glycidyl methacrylate (GMA), glycidyl acrylate (GA) or mixtures thereof.

Copolymers of the present invention are prepared from glycidyl (meth)acrylates and substituted halostyrenes of the formula:

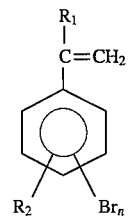

where $R_1$=H or $CH_3$, $R_2$=H or $C_{1-4}$ alkyl, and n=1–5. For example, $R_2$ may be selected from methyl, ethyl, propyl or butyl. A particularly preferred halostyrene is a brominated styrene, including monobromostyrene, dibromostyrene, tribromostyrene and mixtures thereof. In a preferred embodiment, the brominated styrene monomer contains a mixture of about 15% monobromostyrene, about 82% dibromostyrene, and about 3% tribromostyrene by weight.

The additives of this invention are formulated with a thermoplastic substrate, with the additive being present in an amount sufficient to provide desired flame retardancy for the thermoplastic. Naturally, the amount of additive included with the thermoplastic can vary depending on the thermoplastic, the amount of flame retardancy desired, and the constitution of the additive, particularly the weight percent of halogen present. In general, the additive is included with the thermoplastic to provide between about 0.5 and 30 weight % halogen, and more preferably between about 1 and 20 weight % halogen, based on the weight of the thermoplastic.

The additives can range considerably in the amount of glycidyl (meth)acrylate and halostyrene present. The additives contain between about 0.1 and about 15 weight % glycidyl (meth)acrylate, and between about 99.9 and about 85 weight % halostyrene. More preferably, the additives contain between about 0.3 and about 10 weight % glycidyl (meth)acrylate, and between about 99.7 and about 90 weight % halostyrene. In another aspect, the additives contain between about 30 and about 70 weight percent halogen, more preferably between about 50 and about 70 weight percent halogen. For example, in one embodiment, the additives contain between about 59 and about 60 weight percent bromine and between about 1.5 and about 2 weight percent glycidyl (meth)acrylate.

Preferably, the flame retardant additive is a random copolymer of the halostyrene and the glycidyl (meth)acrylate, most preferably dibromostyrene and GMA or GA. The preferred additives consist essentially or totally of the halostyrene and the glycidyl (meth)acrylate. The additives preferably have peak molecular weights of about 500 to about 200,000, compared to polystyrene standards, with 1,000 to 100,000 being most preferred.

The copolymer can be obtained by solution, suspension, emulsion, or bulk polymerization techniques. A processing device may be used to prepare the compositions of the present invention, such as an extruder, for example, a twin-screw or a single-screw extruder, an intensive mixer, a continuous mixer, a Buss kneader, or the like. The operation of and indications for these techniques and systems are generally described in the *Concise Encyclopedia of Polymer Science & Engineering, 2nd ed.* (1990), John Wiley & Sons, New York. It will be appreciated by those skilled in the art that the techniques and instrumentation selected to prepare the additives and compositions of the invention are not critical. The skilled artisan will readily be able to choose the appropriate techniques and instrumentation.

The most preferred method of the present invention involves combining the styrene and glycidyl monomers with a radical initiator such as dicumyl peroxide, benzoyl peroxide, t-butyl perbenzoate, 2,2'-azobis(isobutyronitrile), cumenehydroperoxide or the like in an extruder or in a kneading type mixer such as a Banbury. The quantity of the initiator used may range from 0.05% to 10% based on the total weight of the mixture, with 0.1% to 5% being preferred. Temperatures are such that the initiator is thermally decomposed and the polymer formed is maintained in a molten state.

The modified polymers of the invention are useful as flame retardant additives in a broad spectrum of substrates; such as polystyrene, acrylonitrile-butadiene-styrene (ABS), styrene-acrylonitrile (SAN), high-impact polystyrene (HIPS), styrene-butadiene-rubber (SBR), poly(vinyl chloride) (PVC), styrene-maleic anhydride copolymer (SMA), polycarbonate, polyphenyleneoxide, nylon, polyester, polyurethane, polyolefins, acrylics, or blends of the aforementioned. Most preferably, the substrate is polybutylene terephthalate, polyethylene terephthalate or liquid crystalline polyester (LCP).

To be useful, a flame retardant should provide a desirable UL (Underwriters Laboratories, Inc.) 94 flammability rating. The UL 94 test is a vertical burning test. A material having a V-0 rating allows only minimal burning and no flaming drip of a standard bar of specified thickness. The V-1 rating applies to a material which allows longer burn times than the V-0, but not flaming drip. The V-2 rating results for a material that allows the same burn time as for the V-1 rating, and also allows flaming drip. Materials which do not meet the V-0, V-1, or V-2 criteria receive a fail rating. Compositions having UL 94 ratings from V-0 to V-2 may be useful depending on the application. The flame retardants provided by this invention have UL 94 ratings ranging from V-0 to V-2. The embodiments having a rating of V-0 is preferred.

The flame retardant additives of this invention provide many advantages over unmodified bromostyrene homopolymer additives, including increased impact strength, improved surface appearance, increased tensile elongation and reduced splay. Impact strength is one of the most important physical characteristics of a polymer. It is a measure of the ability of a material to withstand the application of a sudden load without failure. Several impact test procedures are known in the art as described in the *Concise Encyclopedia of Polymer Science & Engineering, 2nd ed.* (1990).

The flame retardant additives of the present invention also yield compositions which have improved surface appearance. In one embodiment including GMA, the product has a clear, pale yellow color and an APHA color of 35, which is an improvement over the APHA value of 120 for polydibromostyrene homopolymer flame retardants. APHA color refers to a color standard according to the test methods given in the *Standard Methods for the Examination of Water and Waste Water*, American Public Health Association, 14th Ed. In general, flame retardants with low APHA color are preferred so they do not impart any color to the fininshed object, or do not interfere with coloring additives. Another test method for referring to the color of organic liquids is the ASTM D 1209 or Platinum-Cobalt scale.

The following specific examples are provided for purposes of illustrating the invention, and no limitations on the invention are intended thereby.

EXAMPLE 1

Preparation of dibromostyrene-co-glycidyl methacrylate using a batch type process A solution of 8 g of glycidyl methacrylate (Aldrich Chemical) in 400 g of Great Lakes Dibromostyrene (DBS) (15% monobromostyrene, 82% dibromostyrene, 3% tribromostyrene) was prepared, to which 0.6 g of a 50/50 (w/w) mixture of di-t-butyl peroxide/cumene hydroperoxide was added. The solution was added in small increments over a 3–5 minute period to a Brabender Prep Center Mixer which had been heated to 220° C. and was stirring at 40 rpm's. The material was allowed to continue mixing for 3 minutes after the last of the monomer had been added. The product was removed from the bowl and was analyzed It was found to contain 59% bromine 0.16% residual DBS, no detectable GMA monomer, and had a peak molecular weight compared with a polystyrene standard of 45,300. Comparison with suitable standards using FTIR (Fourier Transform Infra-Red) spectroscopy confirmed that the copolymer contained 1.5–2.0% GMA.

EXAMPLE 2

Preparation of the copolymer using a continuous process; demonstration of color improvement The following materials were combined:

| Component | Weight, g | % of Composition |
|---|---|---|
| Great Lakes Dibromostyrene | 15,515 | 97.69 |
| Glycidyl Methacrylate | 310 | 1.95 |
| t-Butyl Peroctoate | 19.4 | 0.12 |
| Cumene Hydroperoxide | 38.8 | 0.24 |

The solution was metered into a Werner & Pfleiderer Model ZSK-30 twin screw extruder (L/d =44/1, 320 rpm's, temperature ramped from 160° C. to 220° C.) at approximately 210 g/minute.

The clear, pale yellow thermoplastic produced averaged 59.2% bromine, 0.53% residual DBS monomer, no detectable GMA monomer, and had a peak molecular weight of 47,000. 50 mL of the copolymer solution in THF was transferred to a comparison tube and placed in a color comparator (LaMotte Chemical, Chesterton, MD). The tube was compared with APHA color standards. The product had an APHA color of 35 compared with 120 for polydibromostyrene homopolymer prepared in exactly the same fashion.

EXAMPLES 3–5

Performance comparison vs. prior art flame retardants in unfilled Polybutylene Terephthalate In the following examples the components were dry blended with the polybutylene terephthalate (PBT) resin and the mixtures were passed through a Berstorff Model ZE-25 twin screw extruder (200 rpm's, barrel temperature at 260°

C.). The compounded formulations were granulated and injection molded in a Newbury Injection Molding Machine Model HI-30 RS. Molding conditions are shown in Table 1.

TABLE 1

Conditions for Injection Molding

| | |
|---|---|
| Injection Pressure, psi | 500 |
| Cycle Time, sec. | 25 |
| Rear Temperature, F. | 520 |
| Front Temperature, F. | 520 |
| Mold Temperature, F. | 180 |
| Screw Speed, rpm | 200 |
| Injection Time, sec. | 10 |

TABLE 2

Performance in Unfilled Polybutylene Terephthalate

| | Example 3 (Comparative) | Example 4 (Comparative) | Example 5 |
|---|---|---|---|
| Composition | | | |
| PBT Resin, % | 82.27 | 80.25 | 80.25 |
| Pyro-Chek 68PB, % | 13.23 | — | — |
| PDBS-80, % | — | 15.25 | — |
| Poly(DBS-co-GMA), % | — | — | 15.25 |
| Antimony Trioxide, % | 4.50 | 4.50 | 4.50 |
| Properties | | | |
| Unnotched Impact, ft-lbs. | 8 | 12 | 25 |
| Tensile Elongation, % | 4.5 | 6.5 | 18.0 |
| HDT (264 psi), °F. | 137 | 129 | 132 |
| UL-94 Rating (1/32 in.) | V-2 | V-2 | V-2 |

Pyro-Chek 68PB brominated polystyrene (66% Br) made by Ferro Corp.
PDBS-80 poly(dibromostyrene)(60% Br) made by Great Lakes Chemical
Poly(DBS-co-GMA) at 1.5–2.0% GMA
All formulations contained 9% bromine by calculation The product from Example 5 had increased impact strength and tensile elongation as compared to the comparative examples while maintaining the a UL-94 rating of V-2.

EXAMPLE 6

The addition of copolymers containing about 2% glycidyl acrylate/98% dibromostyrene with other thermoplastic substrates, including polystyrene, acrylonitrile-butadiene-styrene (ABS), styrene-acrylonitrile (SAN), high-impact polystyrene (HIPS), styrene-butadiene-rubber (SBR), poly(vinyl chloride) (PVC), styrene-maleic anhydride copolymer (SMA), polycarbonate, polyphenyleneoxide, nylon, polyester, polyurethane, polyolefins, acrylics, polybutylene terephthalate, and polyethylene terephthalate and blends thereof similarly yields thermoplastic compositions having improved flame retardancy and mechanical properties.

EXAMPLES 7–9

Performance comparison vs. prior art flame retardants in filled Polyethylene Terephthalate Components were dry blended with glass filled polyethylene terephthalate (PET) resin and the mixtures were passed through a 1.25 inch single screw extruder with an L/d of 25/1. Extruder temperatures were ramped from 290° C. to 295° C. from throat to die, and rpm's were maintained at 60. The extruded materials were granulated and dried over night at 125° C. before molding into test specimens using the following conditions:

TABLE 3

Conditions for Injection Molding of PET

| | |
|---|---|
| Injection Pressure, psi | 2000 |
| Cycle Time, sec. | 25 |
| Rear Temperature, °F. | 540 |
| Front Temperature, °F. | 540 |
| Mold Temperature, °F. | 180 |
| Screw Speed, rpm | 50 |
| Injection Time, sec. | 10 |

Flame retardancy of the compositions was determined using the UL-94 standard.

TABLE 4

| | Example 7 (Comparative) | Example 8 (Comparative) | Example 9 |
|---|---|---|---|
| Composition | | | |
| PET @ 30% Glass, % | 85.5 | 84.0 | 84.0 |
| PyroCheck 68PB, % | 9.5 | — | — |
| PDBS-80, % | — | 11.0 | — |
| Poly(DBS-co-GMA), % | — | — | 11.0 |
| Sodium Antimonate, % | 5.0 | 5.0 | 5.0 |
| Flammability | | | |
| UL-94 Rating (1/32 in.) | V-2 | V-2 | V-0 |

These results demonstrate that the poly(DBS-co-GMA) copolymer provides a resistance to dripping during the flammability test, resulting in a higher rating than brominated polystyrene or the PDBS homopolymer.

EXAMPLE 10

A copolymer containing about 2% glycidyl acrylate-glycidyl methacrylate blend/98% dibromostyrene is prepared as in EXAMPLE 1. The copolymer is compounded into several engineering thermoplastic resins to provide flame retardancy and improved mechanical properties versus PDBS homopolymer.

EXAMPLE 11

A copolymer containing about 2% glycidyl acrylate/98% chlorostyrene is prepared as in EXAMPLE 1. The copolymer is compounded into several engineering thermoplastic resins to provide flame retardancy and improved mechanical properties versus PDBS homopolymer.

EXAMPLE 12

A copolymer containing about 0.3% glycidyl acrylate/ 99.7% dibromostyrene is prepared as in EXAMPLE 1. The copolymer is compounded into several engineering thermoplastic resins to provide flame retardancy and improved mechanical properties versus PDBS homopolymer.

Prior to polymerization, a minor amount of other reactive unsaturated monomers can be mixed into the brominated styrene for the purpose of additional property modification. Examples of modifications that might be desirable include changes in color, clarity, lubricity, compatibility, melt viscosity, softening point, thermal stability, ultraviolet stability, viscoelastic behavior, polarity, biodegradability, and static charge dissipation. Examples of potential reactive comonomers are maleic anhydride, styrene, substituted styrenes such as alpha-methylstyrene and chloromethylstyrene, acrylonitrile, methylmethacrylate, acrylic acid, methacrylic acid, butadiene and acrylamide. For example, a mixture of 95% dibromostyrene/3% glycidyl (meth)acrylate/2% maleic anhydride by weight, and containing 0.1% of a 50/50 (w/w) mixture of di-t-butyl peroxide/cumene hydroperoxide was processed through the equipment of Example 1. The product was a thermoplastic material useful as a flame retardant in polymeric systems.

While the invention has been described in detail in the foregoing description, the same is to be considered as illustrative and not restrictive in character, it being understood that only the preferred embodiments have been shown and described, and that all changes and modifications that come within the spirit of the invention are desired to be protected.

Any publications cited herein are hereby incorporated by reference in their entirety as if each had been individually incorporated by reference and fully set forth.

What is claimed is:

1. A flame retardant additive comprising a copolymer derived from glycidyl (meth)acrylate monomers and halostyrene monomers, wherein said halostyrene monomers have the formula:

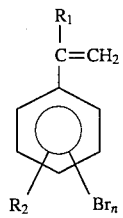

where $R_1$=H or $CH_3$, $R_2$=H or $C_{1-4}$ alkyl, and n=1–5, said copolymer containing from about 0.1 to about 15 percent by weight units derived from glycidyl (meth)acrylate monomers, and wherein said copolymer has a peak molecular weight compared with a polystyrene standard of about 500 to about 200,000.

2. The flame retardant additive of claim 1 wherein said copolymer is a random copolymer.

3. The flame retardant additive of claim 1 wherein the additive has a APHA solution color of about 35.

4. The flame retardant additive of claim 1 wherein the additive has a peak molecular weight compared with a polystyrene standard of about 1,000 to about 100,000.

5. The flame retardant additive of claim 1 wherein said glycidyl (meth)acrylate monomer is glycidyl methacrylate and said halostyrene monomers are selected to be a mixture of about 15% monobromostyrene, about 82% dibromostyrene, and about 3% tribromostyrene by weight.

6. The flame retardant additive of claim 1 containing from about 0.3 to about 10 weight percent derived from glycidyl (meth)acrylate monomers.

7. The flame retardant additive of claim 6 containing from about 1.5 to about 2 weight percent units derived from glycidyl (meth)acrylate monomers.

8. The flame retardant additive of claim 1 wherein said halostyrene monomers are selected from the group consisting of monobromostyrene, dibromostyrene, tribromostyrene and mixtures thereof.

9. The flame retardant additive of claim 8 wherein said halostyrene monomers are a mixture of about 15% monobromostyrene, about 82% dibromostyrene, and about 3% tribromostyrene by weight.

10. The flame retardant additive of claim 1 containing from about 30 to about 70 weight percent bromine.

11. The flame retardant additive of claim 10 containing from about 50 to about 70 weight percent bromine.

12. A flame retarded, thermoplastic composition comprising:

a thermoplastic substrate requiring flame retardancy and a flame retardant amount of a copolymer derived from glycidyl (meth)acrylate monomers and bromostyrene monomers, said copolymer containing from about 0.1 to about 15 percent by weight units derived from glycidyl (meth)acrylate monomers, and wherein said copolymer has a peak molecular weight compared with a polystyrene standard of about 500 to about 200,000.

13. The composition of claim 12 wherein said copolymer is a random copolymer.

14. The composition of claim 12 wherein the copolymer has a peak molecular weight compared with a polystyrene standard of about 1,000 to about 100,000.

15. The composition of claim 12 wherein said glycidyl (meth)acrylate monomer is glycidyl methacrylate and said halostyrene monomers are selected to be a mixture of about 15% monobromostyrene, about 82% dibromostyrene, and about 3% tribromostyrene by weight.

16. The composition of claim 12 wherein the substrate is polystyrene, acrylonitrile-butadiene-styrene, styrene-acrylonitrile, high-impact polystyrene, styrene-butadiene-rubber, poly(vinyl chloride), styrene-maleic anhydride copolymer, polycarbonate, polyphenyleneoxide, nylon, polyester, polyurethane, polyolefins, acrylics, or blends thereof.

17. The composition of claim 12 wherein the substrate includes polybutylene terephthalate.

18. The composition of claim 12 wherein the substrate includes polyethylene terephthalate.

19. The composition of claim 12 wherein the substrate includes liquid crystalline polyester (LCP).

20. The composition of claim 12 wherein said copolymer contains from about 0.3 to about 10 weight percent units derived from glycidyl (meth)acrylate monomers.

21. The composition of claim 20 wherein said copolymer contains from about 1.5 to about 2 weight percent units derived from glycidyl (meth)acrylate monomers.

22. The composition of claim 12 wherein said bromostyrene monomers are selected from the group consisting of monobromostyrene, dibromostyrene, tribromostyrene and mixtures thereof.

23. The composition of claim 22 wherein said bromostyrene monomers are selected to be a mixture of about 15% monobromostyrene, about 82% dibromostyrene, and about 3% tribromostyrene by weight.

24. The composition of claim 12 wherein said copolymer contains from about 30 to about 70 weight percent bromine.

25. The composition of claim 24 containing from about 50 to about 70 weight percent bromine.

26. The composition of claim 12 wherein the UL-94 rating of the composition is from V-0 to V-2.

27. The composition of claim 19 wherein the UL-94 rating of the composition is V-0.

* * * * *

UNITED STATES PATENT AND TRADEMARK OFFICE
CERTIFICATE OF CORRECTION

PATENT NO. : 5,565,538
DATED : October 15, 1996
INVENTOR(S) : Gurudas Zingde, Nicolai A. Favstritsky and Ray W. Atwell It is certified that error appears in the above-indentified patent and that said Letters Patent is hereby corrected as shown below:

In col. 4, line 24, please insert a period before "It".

In col. 4, line 25, please insert a comma after "bromine".

In col. 6, line 39, after "Table 4" please insert:
--Flammability of Filled Polyethylene Terephthalate--

In col. 8, line 12, after "percent", please insert --units--.

Signed and Sealed this

Twenty-fifth Day of March, 1997

Attest:

BRUCE LEHMAN

Attesting Officer

Commissioner of Patents and Trademarks